United States Patent
Hsiao et al.

(10) Patent No.: US 6,804,674 B2
(45) Date of Patent: Oct. 12, 2004

(54) SCALABLE CONTENT MANAGEMENT SYSTEM AND METHOD OF USING THE SAME

(75) Inventors: Hui-I Hsiao, Saratoga, CA (US); Robin Williams, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 09/909,590

(22) Filed: Jul. 20, 2001

(65) Prior Publication Data
US 2003/0018624 A1 Jan. 23, 2003

(51) Int. Cl.[7] ........................ G06F 17/30; G06F 15/173; G06F 17/00
(52) U.S. Cl. .............................. 707/10; 707/3; 709/223; 715/500.1
(58) Field of Search .............................. 707/1–5, 6, 10, 707/100–102, 104.1; 715/5.3

(56) References Cited

U.S. PATENT DOCUMENTS

| | | |
|---|---|---|
| 5,864,843 A | 1/1999 | Carino et al. |
| 5,873,083 A | 2/1999 | Jones et al. |
| 6,021,410 A | 2/2000 | Choy |
| 6,029,168 A | 2/2000 | Frey |
| 2002/0033844 A1 * | 3/2002 | Levy et al. .................. 345/744 |

* cited by examiner

Primary Examiner—Alford Kindred
(74) Attorney, Agent, or Firm—Samuel A. Kassatly

(57) ABSTRACT

A scalable content management system manages searches from a local content manager and a plurality of remote content managers. A single scalable content manager manages data in a content repository or file system and its associated metadata in the same content repository or in a database, which will greatly simplify both content management logic and client application logic. The system architecture enables users to add scalable content managers as needed, which allows users to easily scale up the scalable content manager system, in both data size and user connection, as business grows. With the present scalable system architecture, a multi-node content management system will appear to be a single content management system to users, providing location transparency.

22 Claims, 7 Drawing Sheets

SCALABLE CONTENT MANAGEMENT SYSTEM AND METHOD OF USING THE SAME

FIELD OF THE INVENTION

The present invention relates generally to the Internet, database, and content management systems for the storage of files and data objects. Particularly, this invention is directed to a system and method for the efficient management of access and control over files and data linked to a database system and stored externally in a file system or another object repository. More specifically, the present invention relates to a scalable eContent system and associated method for managing the same.

BACKGROUND OF THE INVENTION

In the past few years, the World Wide Web ("the web") has become a very important medium for information sharing and distribution. The number of business transactions taking place on the web has also been constantly increasing. This has resulted in significant changes in the way organizations communicate with their customers, employees and business partners.

Although companies still communicate information with sound, pictures, video, and the written word, the size and content of the information and the access frequency to the information are increasing faster than ever before. In addition, companies are making content available and accessible to employees, customers, and even general public from anywhere on the web, for competitive, contractual, financial, and legal reasons.

Corporate communications span multiple environments, employ diverse platforms and protocols, innumerable applications, WANs, LANs, extranets, intranets, and Virtual Private Networks (VPN). How to efficiently manage the fast growing information content and consistently keep up with the constant modifications to the information content have become major challenges to the information technology (IT) organizations in both large and small companies. Web applications providing gateways to corporate resources access and revise information from multiple legacy systems and repositories.

Traditionally, content management systems are accessed by a small number of clients (or employees) within an enterprise and only a small subset of the business information is stored on-line in these systems. Supporting large numbers of client connections is not a major concern in such an environment. However, when information is accessible to all employees, or even to customers and partners, through the web, client connection scalability becomes yet another major challenge to the IT professional.

In a content management system, three types of information are stored: primary content (also referred to as Data or Object), User Metadata, and System Metadata. Semi-structured and unstructured data, such as text file, image, web page, video clip, etc., constitute the primary content in a content management system. Description of, and information about the stored primary content, which are normally provided by the users, are referred to as user metadata.

The information created by the content management systems for access control, storage management, and content tracking/reference is referred to as system metadata. In contrast to the primary content, both user metadata and system metadata are well structured. Content management systems, in general, use a database system as a persistent repository for storing both user metadata and system metadata.

While semi-structured and unstructured data can also be stored in database tables, they are normally stored outside of databases in practice for performance and accessibility reasons. This is because of several reasons, among which are the following:

(a) the size of these types of data tends to be very large and the conventional database systems are not designed to handle them efficiently; and (b) storing primary content (e.g. files) in a database makes it very difficult for applications to access the content through a native application program interface (API). Consequently, content management systems normally store and manage primary content and metadata separately. This leads to a distributed system architecture where the system storing metadata for search and access control becomes the master, commonly referred to as the library server (LS), while one or more systems storing the primary content become the slaves or the object servers (OS). OS is also known as resource manager (RM).

The current generation of conventional content management products is based on a self-contained, closed system architecture, and as such the content management have poor extensibility. The new generation of content management systems adopt an open system architecture that promises to fix the extensibility problem and to improve the system performance. However, such content management systems continue to be based on a distributed system architecture that will face many of the same issues encountered in the traditional distributed (database) systems.

Conventional content management systems provide a set of functions for content (data and metadata) creation, content management, and content distribution that enable users to manage data, system metadata, and user metadata. These conventional content management systems suffer from numerous shortcomings, among which are the following:

(a) Lack of Scalability and Extensibility:

Since a computer system has limited processing power and storage capacity, a content management system needs to have an architecture that is scalable so as to support future business/content growth. Three areas of scalability of particular interest to content management users are: primary content, metadata, and client/user connections.

For scalability in total content size and in the number of objects, conventional content management systems allow a library server to manage objects stored in multiple distributed object servers. When the total size of the primary content saturates or exceeds the capacity of an object server, an additional object server is installed. On the other hand, current content management systems cannot gracefully handle a significant increase in either metadata size or the number of client connections without a major architecture overhaul.

When the size of the metadata out-grows the capacity of a library server, multiple library servers must be installed, each managing a subset of the objects. Like all distributed systems, this type of space partition has a major problem, namely location transparency to clients. Since each library server is an autonomous server and it has no knowledge of remote objects stored in other library servers, clients are forced to keep track of each library server's storage content. In addition, if a client needs to search information in all the library servers, the client is forced to establish individual connections to the library servers and to manage the merging of the results from multiple library servers.

Client connection scalability is also a significant limitation of the conventional content management architecture. When the number of users exceeds the capacity and/or processing power of a content management system, one can either limit the number of concurrent client connections or employ a more powerful computer system. Limiting client connections reduces productivity and limits company growth potential making it very undesirable. Replacing an existing computer system with a new one may require unloading data from old machine and reloading the data into the new machine, which is a cumbersome task as the size of data is normally huge. In addition, powerful machines are much more expensive and not always available.

The other alternative for providing client connection scalability is by installing multiple servers with replicated content, for example Yahoo web server, and a middle-tier server that is responsible for routing requests to one of the replicated servers. Replicating content incurs additional problem and complexity of synchronizing replicas.

(b) Poor Atomicity and Referential Integrity:

When an object is inserted or updated in a content management system, reference to and description of the object will also need to be created or updated in order to provide data consistency and avoid a referential integrity (RI) problem. Since objects are stored in an object server while metadata (reference, description, etc.) are stored in a library server, a distributed two-phase commit protocol is needed with the conventional architecture to guarantee consistency and preserve referential integrity.

While a distributed two-phase commit protocol has been studied extensively and is well understood, it is a complex protocol to implement, especially in the failure handling aspect, and has a very negative impact on performance. Furthermore, since the client is the one driving the insert/update logic, it is the best place to also drive the transaction (commit/rollback) logic. Most likely, a client machine is less reliable than either a library server or an object server machine. Thus, it would be undesirable, in terms of reliability, to drive the transaction logic at the client machine.

(c) Difficulty Integrating Existing Content:

A migration path is an important issue for users/customers of any computer software systems. A content management system needs to provide an easy and flexible migration path for users who have large amounts of data in file systems or in some forms of resource managers (e.g. video server). Conventional content management systems cannot manage objects stored in a file system directly as they do not support access to object via standard file system call, for example.

(d) Heterogeneous Communication and Access Protocol:

When multiple library servers and object servers are installed, a library server will use one set of protocol to communicate with other library servers but a different set of protocol to communicate with object servers, and vice versa. Since a client needs to access both library servers and object servers, the client will also need to use two different sets of protocols to access both the library server and the object server. This not only makes the implementation and installation of the content management software more complex, but also results in a complicated runtime environment.

(e) Limited Accessibility and Availability:

Access from any remote location is not a design goal of conventional content management architectures. To enable web browser access, a web enabler component such as an enterprise portal (EP) is added on top of the content management. Since the enterprise portal acts as a broker/intermediator in such a design, content management functions and content cannot be fully and/or directly explored by thin clients such as web browsers.

SUMMARY OF THE INVENTION

It is a feature of the present invention to present an architecture and associated method for a scalable content management (also referred to herein as "eContent management") system, that satisfies the need of high scalability, pervasive accessibility, enhanced integrity, and extensibility. More specifically, the invention proposes a scalable eContent management architecture ("SeCMA") for managing both enterprise and web contents. This architecture includes an integrated and scalable eContent (or content) manager (SeCM) as a building block, that can be used to build a personal content manager on a small home PC or a high powered and highly scalable web and/or enterprise content server, by installing the scalable content manager on each of the computers, on a cluster of high power computers.

The scalable content manager on a single computer manages both data in a local file system (or a resource manager) and its associated metadata stored in a local database, which will greatly simplify both content manager logic and client application logic. The proposed architecture enables users to add scalable content manager nodes as needed, which allows users to easily scale up a scalable content manager system, in both data size and user connection, as business grows.

The proposed SeCM architecture will also include a tightly integrated http server that allows clients, such as web browsers, direct access to the content management system from anywhere on the web. In addition, the architecture enables users to convert an existing system (e.g. a filesystem) into a scalable content management system by installing a copy of the scalable content manager to the existing system. With the present scalable content management architecture, a multi-node content management system will appear to be a single content management system to users, thus providing location transparency.

The present architecture enables users to selectively scale a content management system as needed. It also provides a single system view to users of the content management system when metadata and objects are stored in multiple computer nodes. The location of an object and its associated metadata are transparent to the client. The need to run complex, distributed transaction protocols is thus obsolesced.

The scalable content management architecture of the present invention also provides direct access for web browsers, to enable users to access the content (or eContent) directly by client with Internet connection. In addition, the scalable content management architecture provides an extensible architecture that enables users to integrate new content, and to migrate existing content with ease and flexibility.

The scalable content management system of the present invention provides several functions, among which are the following:

(a) Integrated Data and Metadata Functions:

The scalable content management system provides integrated data (primary content) and metadata management functions, and therefore the logic for implementing the functions as well as application logic are significantly simplified. In addition, data and its associated metadata are collocated and under the control of a single SeCM. Thus update atomicity and referential integrity for managed data and metadata are maintained and enforced by a single scalable content manager, which does not require complex distributed commit protocol across distributed library server and object server nodes as in the traditional CM systems. In addition, a client will resign the responsibility to coordinate the updates to the library server and the object server. Also, mapping a logical reference to a physical object reference for object access and access control for both data and its metadata is done by a single scalable content manager, which will not require any coordination of access control and/or shared secret between the library server and the object server as in the traditional approach.

(b) Enhanced Scalability and Manageability:

A single scalable content manager will provide the functions needed for content creation, storage, search, management, and distribution. For a company with a relatively small amount of data/content, a content management system with a single scalable content manager (SeCM) can be installed on a single computer system. As the content (both object and metadata) size grows, additional scalable content managers can be installed on new computer systems. This provides a smooth path for scaling up when company business grows.

When a new scalable content manager is installed on a new machine, users may opt to redistribute some of the existing content from existing scalable content managers to the newly added scalable content manager, or may elect to leave the existing content intact and store only the new content to the new scalable content manager. In the event that a new scalable content manager is added to support growth in the number of users, content may have to be redistributed to the newly installed scalable content manager in order to balance the workload among all scalable content manager in a content management system.

(c) Single System View (Location Transparency):

Scalable content management systems communicate amongst themselves in order to provide a single system view to clients. A client can connect to any scalable content management system node to perform content creation, search, and update. It does not need to know which library server node to connect to for searching or updating an object and its metadata. By providing location transparency to clients, client application logic is also simplified.

(d) Global Metadata Index:

When a client requests to access metadata and objects stored in remote scalable content managers, the local scalable content manager that the client is connected to divides the request into sub-requests and broadcasts them to one or more remote scalable content managers. The local scalable content manager then collects and integrates replies/results from remote ones and delivers the results back to the client. When the number of installed scalable content managers in a content management system is small, it may be acceptable to always broadcast a request to all the scalable content manager nodes, even when only one or two scalable content managers store the objects and metadata requested by the client. When the number of installed scalable content managers is large, global metadata indexes would be provided to pin-point the specific scalable content manager or managers for servicing the sub-requests. This will reduce the number of messages sent and processed for a request, and thus improves the system performance.

(e) Accessibility:

Besides being an integrated scalable content management system, the scalable content management system of the present invention also includes one or more http daemons (httpd). Each httpd will make requests to the local scalable content manager through a set of servlets and/or executable programs. New servlets or programs can be installed to provide new or additional functions as needs arise. Clients can access any of the data using a browser from anywhere on the internet. This provides direct access to the scalable content management system from any browser.

(f) Integration of Existing Content:

When integrating existing content (e.g. files) into a scalable content management system, it does not require that existing data stored in the file system be extracted and reloaded, as in the conventional content management systems. The scalable content management system provides the flexibility and functionality for integrating existing data in the file system efficiently. With the scalable content management system, existing data in the file system can be brought into the scalable content management system control incrementally, or as needed. Users need only specify the names of the files (or file system) and create user metadata for the files to be managed by the scalable content management system.

In addition, the system administrators can add a SeCM software to an existing system to convert it into a scalable content management system with all the desirable properties provided by the present invention. For example, assume a company has several machines managing files. To convert the existing machines managing files into a scalable content management system, the company can install the scalable content manager on each machine, index all the files, then link together the scalable content managers and create share catalogs that describe all the files and their locations (i.e., indexing), provide the web browser access to all the data, and also allow existing applications to run using the original filesystem API.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE PREFERRED EMBODIMENTS

Figure 1:
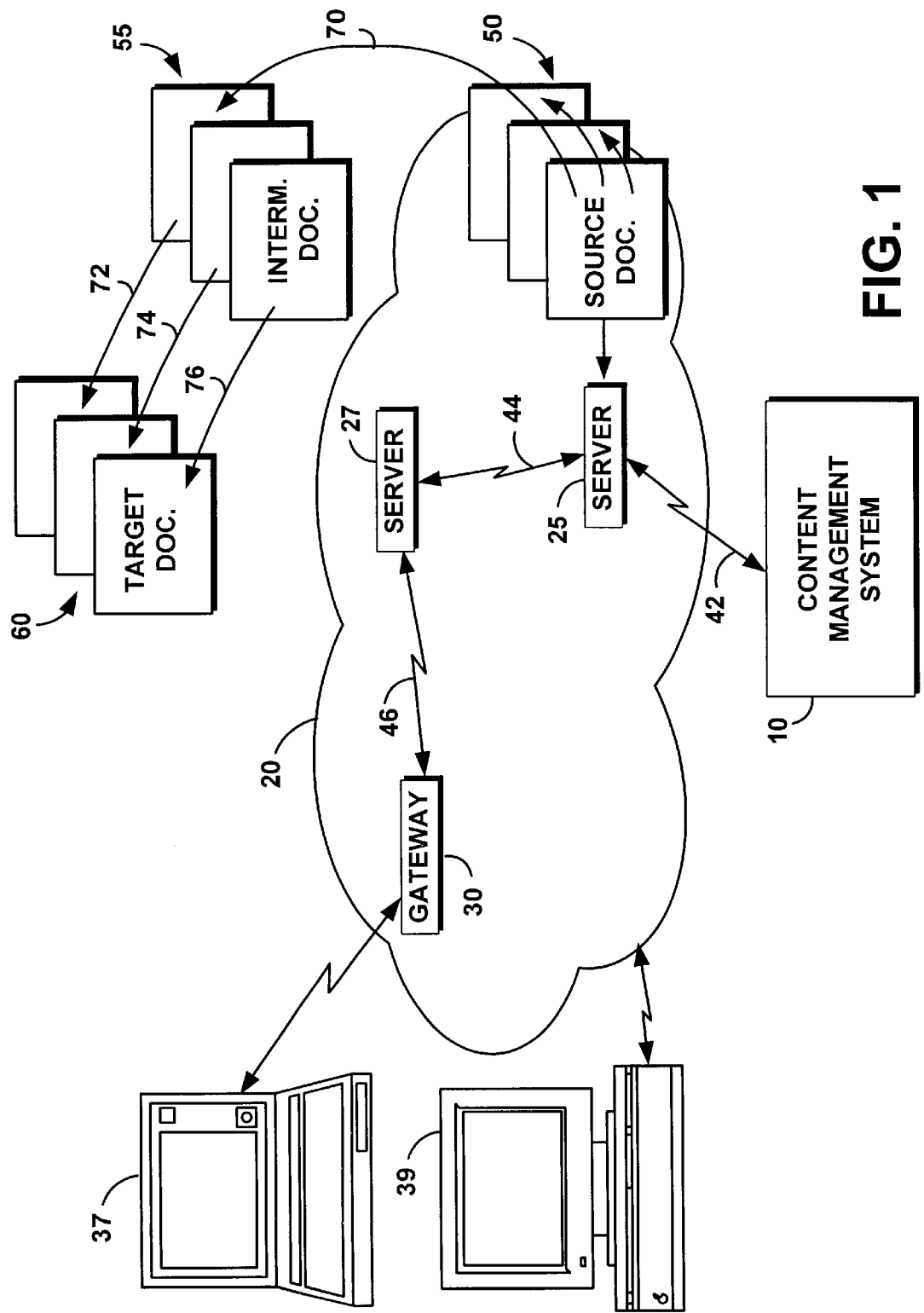
FIG. 1 is a schematic illustration of an exemplary operating environment in which a content management system of the present invention can be used.

The following definitions and explanations provide background information pertaining to the technical field of the present invention, and are intended to facilitate the understanding of the present invention without limiting its scope:

Application Programming Interface (API): In programming, API stands for the calling conventions, i.e., interface, by which an application program interacts with the operating system. An API can also provide an interface between lower level utilities and high level language. Lower level utilities include services written without adhering to the interface supported by compiled languages. In such a case, the API's main task may be the mapping of parameter lists from one format onto another or the interpretation of call-by-value and call-by-reference arguments during data transfer. API's are defined at source code level; they provide a degree of abstraction between the application and privileged utilities, such as the kernel, to guarantee the code's portability.

Authentication: The process of identifying a user, usually based on a user/log-in name and password. Authentication is distinct form authorization which is the process of giving individuals access to system objects based on their identity. Authentication ensures that the individual is who he or she claims to be.

Common Gateway Interface (CGI): A standard for executing external programs from a World-Wide Web HTTP server. CGI determines how to transfer arguments to the running program as part of the HTTP request. It also describes a set of environment parameters. Commonly, the program will create some HTML to be transferred to the browser; alternately, it can request URL redirection. CGI allows the returned HTML (or other document type) to depend in any arbitrary way on the request. The CGI program can, for example, access information in a database and format the results as HTML. A CGI program can be any program that can accept command line arguments.

Daemon: An acronym for "Disk And Execution MONitor". It is an algorithm that is not invoked explicitly, but lies dormant waiting for some condition(s) to occur. In other words, it is a process that is constantly running on a computer system to service a specific set of requests. In UNIX, for example, lpd is a daemon that manages printing requests. Daemons are self-governing functions. Although they are not part of an application program, daemons may service application requests.

Content or eContent management system: A network or web-based content management system that provides a flexible platform to develop e-business information systems supporting interaction among employees, partners, and clients. It provides enterprise-wide access offering a strategic solution for doing business at digital speed. The content management system of the present invention is scalable and may include (or installed on) several computers (or servers), each running its own scalable content manager.

File Transfer Protocol (FTP): FTP is a client-server protocol which enables a user to transfer files between computers over a network. It also refers to the client program which the user executes in order to transfer files.

Hypertext Markup Language (HTML): It is a document format used on the World-Wide Web. The World-Wide Web Consortium (W3C) is the body that sets international standards for HTML.

Information Technology (IT): Refers to both software and hardware in applied computer systems. IT often includes networking and telecommunications, usually in the context of an enterprise or a business.

Library Server (library server): It is the component of a traditional content management system that contains index information for the objects stored on one or more object servers.

Object Server (object server): It is the component of a traditional content management system that physically stores the objects or information accessed by client applications. Object server and object manager are used interchangeably herein.

Servlet: Analogous to a World-Wide Web applet, a servlet is a Java program that runs as part of a network service, typically an HTTP server, and entertains clients' requests. It is most commonly used in extending a web server by the dynamic generation of the web content. For example, a client may need information from a database; a servlet can be coded to receive the request, retrieve and process the data then to return the desired result to the client. Servlets, like applets, allow the client and server to be extended in a modular way by dynamically loading a communications code linking to the main program via a standard programming interface.

FIG. 1 portrays an exemplary overall environment in which a scalable content management system 10 of the present invention may be used. The system 10 includes a software or computer program product that is typically embedded within, or installed, at least in part, on one or more host servers. Alternatively, the system 10 can be saved on a suitable storage medium such as a diskette, a CD, a hard drive, or like devices. While the system 10 will be described in connection with the WWW, the system 10 can be used with a stand-alone database of documents that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 37, 39, and can query a content management system 10 for the desired information.

The content management system 10 is connected to the network 20 via a communications link such as a telephone, cable, direct internet, or satellite link 42. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50 (source document), 55 (intermediate document), 60 (target document) most likely include embedded hypertext links to other locally stored pages, and hypertext links 70, 72, 74, 76 to other webs sites or documents 55, 60 that are stored by various web servers such as the server 27.

Figure 2:
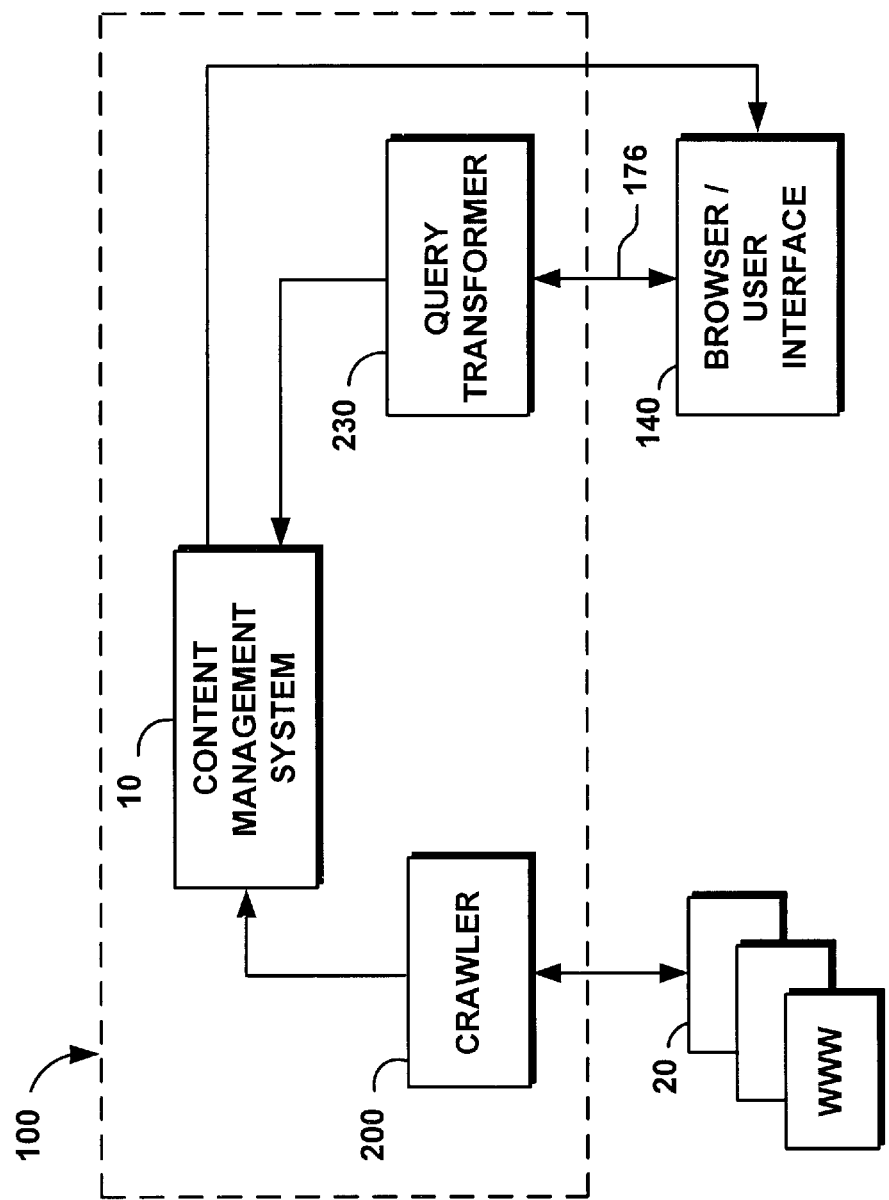
FIG. 2 is a high level architecture illustrating the content management system of FIG. 1 in use as part of a network service provider, such as an Internet service provider.

FIG. 2 illustrates an exemplary high level architecture showing the scalable content management system 10 of FIG. 1 used in the context of an Internet search. Though the system 10 is illustrated and described herein in the context of an Internet search, it should be amply clear that the system 10 may be used in various other applications, such as in an intranet or enterprise content management applications.

The system 10, transparently to the user, continuously or periodically operates in the background. While the service provider 100 and the system 10 are illustrated herein as being integrated, it should be clear that these two components can be functionally and/or physically separated.

In use, the client query is forwarded to the service provider 100, and more particularly to the scalable content management system 10. The query and query results can be stored, for example in a designated repository or in any other data storage system, whether on the user's side, the service provider's (100) side, or an independent network storage repository.

According to one embodiment, the service provider 100 is generally comprised of the scalable content management system 10, a web crawler 200, and a query transformer 230. Optionally, the search service provider 100 includes a search result transformer (not shown).

The query transformer 230, prompted by the user browser 140, transforms user requests to CM system requests. The CM system then processes the received requests against the locally stored abstracts/indexes data repository and generates a search result with matches (or search results) that are specific to the user's query. The search results are transformed into viewable or browsable form (i.e., HTML) by a result transformer, and the transformed data is subsequently presented to the user at the user interface (UI) or browser 140.

Figure 3:
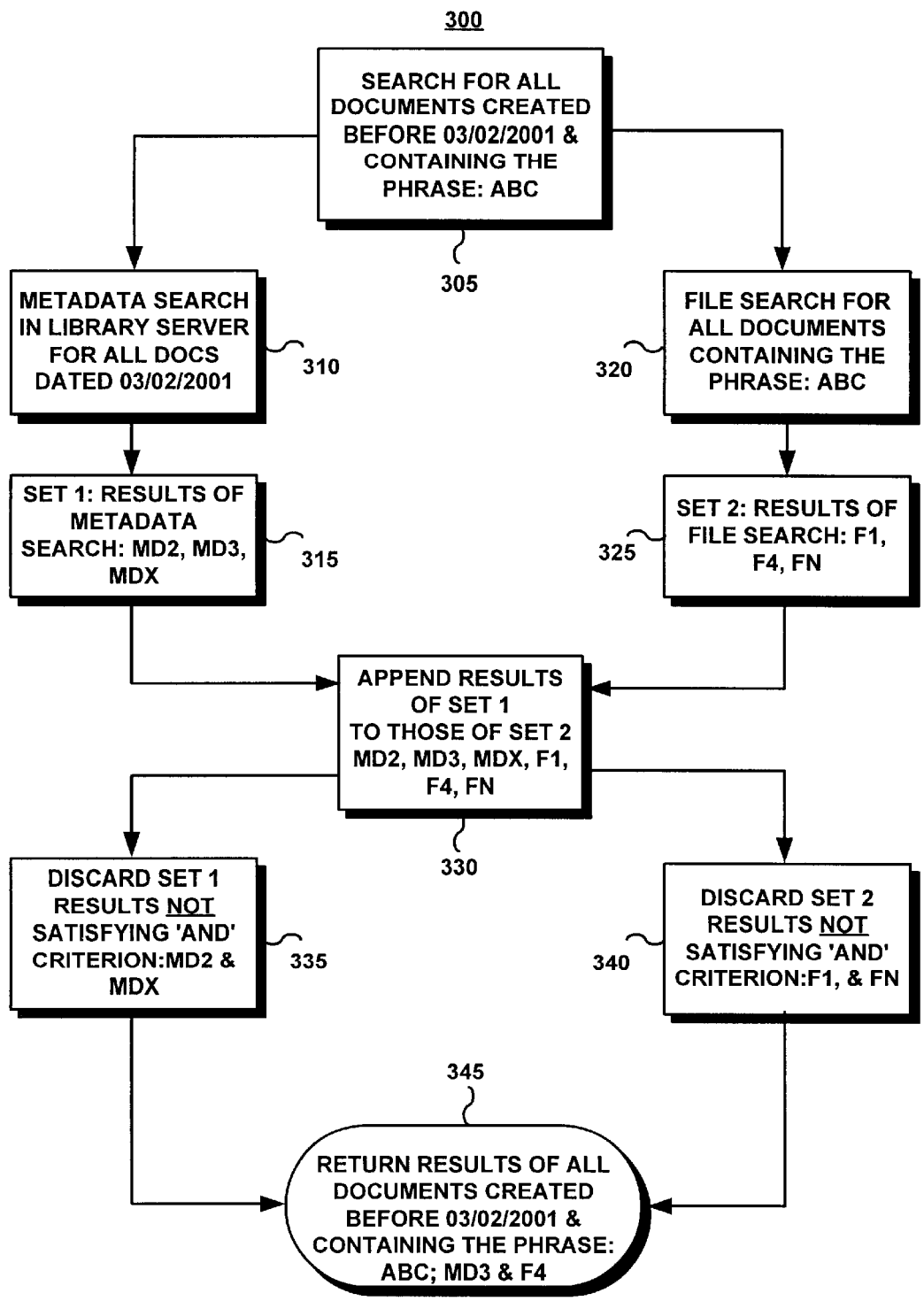
FIG. 3 is a flowchart illustrating an exemplary process implemented by a conventional information processing architecture that does not utilize the scalable content management system of the present invention.

FIG. 3 is a flowchart illustrating an exemplary process 300 implemented by a conventional information processing architecture that does not utilize the scalable content management system 10. Process 300 starts at block 305 wherein a query with two ANDed input parameters is initiated. Without the scalable content management system 10, the two search criteria "all documents created before Mar. 2, 2001" AND "containing the phrase ABC" are forwarded to a metadata search engine and to a file search engine.

Metadata search is conducted at step 310 in a library server that contains index information for the objects stored on one or more object servers, where the objects or information accessed by client applications are physically stored. In this example, the parametric search is set for the creation date criterion portion of the search. The result of the parametric search is returned at step 315 in the form of Set 1 that contains for example, metadata MD2, MD3, and MDx. This result will be appended, at step 330, to the result of the file (or content) search that is conducted in parallel, starting at step 320.

The file search is conducted in the object server at step 320, which contains information for the stored objects. In this example the search is set for the phrase content criterion portion of the search. The result of the phrase search is returned in the form of Set 2 that contains, for examples, files F1, F4, and Fn. As indicated earlier, this result will be appended to that of the metadata search at 330.

At step 330, the combined "raw" search results from Set 1 and Set 2, namely F1, F4, Fn, MD2, MD3, and MDx are subjected to the AND logic operation in order to meet both search criteria: "all the documents created before Mar. 2, 2001" AND "containing the phrase ABC".

The results from Set 1 that do not meet the AND criterion are discarded at step 335. In this example, MD2, and MDx meet the date criterion, but do not contain the phrase "ABC". Similarly, the results from Set 2 that do not meet the AND criterion are discarded at step 340. In this example, F1 and Fn contain the phrase "ABC", but do not meet the date criterion. The logical results of the search, namely, F4 and MD3 that satisfy both query criteria are returned to the client at step 345.

Figure 4:
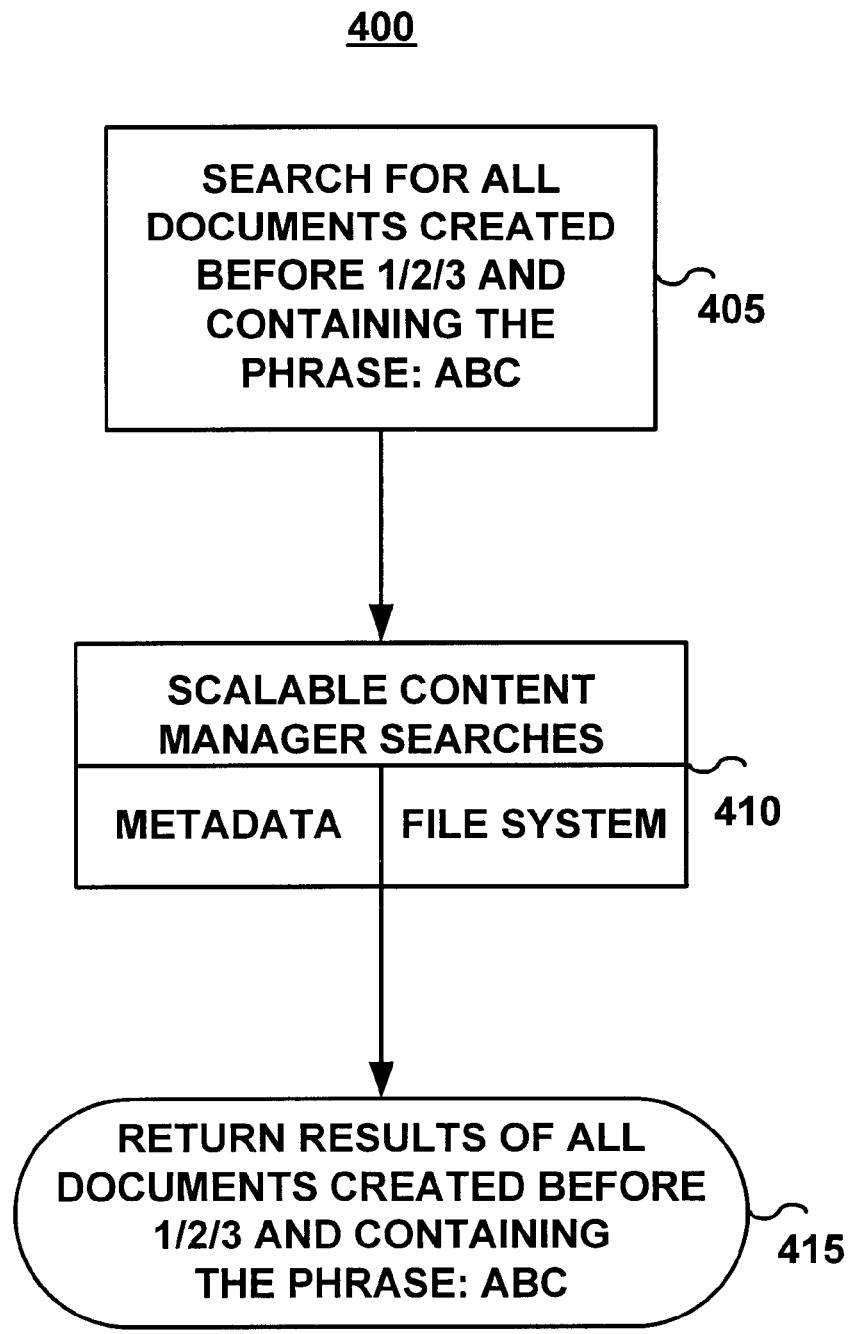
FIG. 4 is a flowchart illustrating the process of using the content management system of the present invention.

FIG. 4 illustrates a process 400 of using the scalable content management system 10 of the present invention, highlighting its compactness and efficiency in processing information. In contrast to the process 300 of FIG. 3, by using the process 400 of the scalable content management system 10, the location of an object and its associated metadata are transparent to the client.

Similarly to process 300 (FIG. 3), process 400 (FIG. 4) starts at block 405 wherein a query with two ANDed input parameters or criteria is initiated. The two search criteria "all documents created before Mar. 2, 2001" AND "containing the phrase ABC" are forwarded to the scalable content manager 515.

At step 4101 and as it will be described later in more detail in connection with FIGS. 5 and 6, the scalable content (or eContent) manager 515 (FIG. 6) searches both the metadata and the file system. It is therefore evident that the location transparency abridges the application logic. The scalable content manager 515 provides an integrated metadata and file/object management function that simplifies both content management and the application logic, resulting in improved system performance. Because the files/objects and associated metadata are indexed and/or managed by the same scalable content manager, the search outcome is expeditious compared with that of process 300. Both query criteria: date and phrase content, are performed as a single search.

Because the location of an object and its associated metadata are managed by the same scalable content manager and are transparent to the client and because there are no complex transactions nor multiple protocols running to fulfill the request criteria, the logical results of the above search are returned to the client immediately at step 415.

Figure 5:
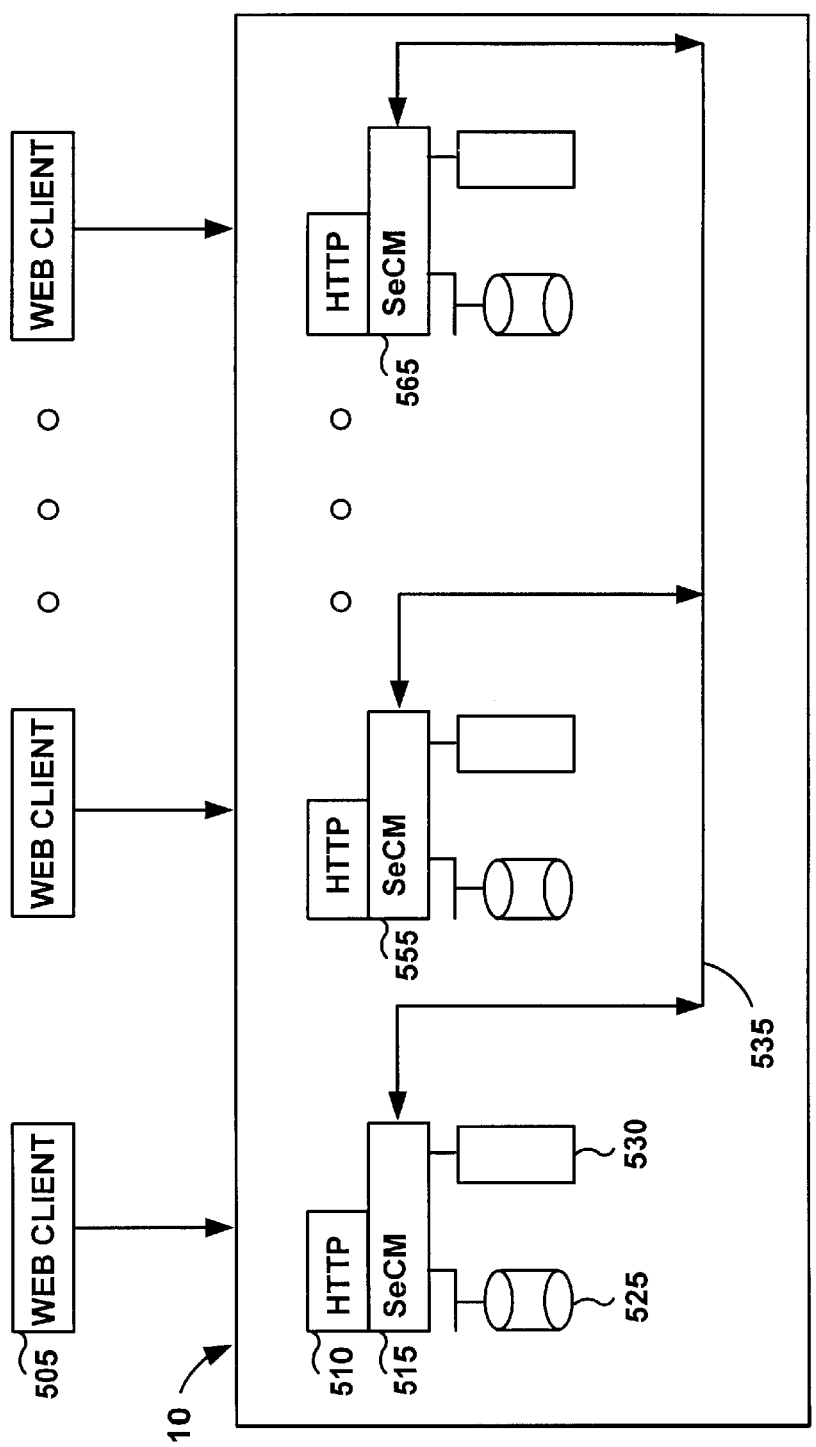
FIG. 5 is a block diagram representation of a scalable content management system architecture of the present invention.

FIG. 5 is a block diagram representation of the scalable content management system 10 according to one embodiment of the present invention. The scalable content management system 10 provides connectivity to a client 505, such as a web client or an end user, who is connected to the service provider 100 (FIG. 2) via the network 20. Connection may be made to any other scalable content manager (acting as a node) to create, update, or search the eContent.

An http daemon (httpd) 510 with a set of cgi/bin or servlet on one or more scalable content managers nodes that access the local scalable content manager 515, directly. The http daemon 510 sends requests to the scalable content manager 515 through a set of cgi/bin (executable programs) and/or servlets.

The scalable content manager (or node) SeCm 515 can either be built on top of a single persistent repository or be built on top of a database management system that provides persistent storage and on top of a file system that manages the primary content. The scalable content manager 515 and the other scalable content manager (or nodes), i.e., 555 and 565, that form part of the scalable content management system 10, map a logical reference onto a physical object reference for object access, and provide access control. This will eliminate the need (as in the conventional approach) of coordination and/or shared information between the object server and the library server.

The scalable content manager 515 manages the metadata stored in a database 525 and the primary content stored in a local file system 530 or resource manager, providing an integrated function of both metadata management and data (primary content) management. As mentioned earlier, the user does not need to know which scalable content manager to connect to for searching, creating, or updating an object and its corresponding metadata. Such location transparency significantly simplifies the client application logic.

The database 525 can be, for example, a repository for a Database Management System (DBMS), a type of computerized record-keeping system that stores data according to a predetermined schema, such as the well-known relational database model that stores information as a collection of tables having interrelated columns and rows. The DBMS performs well at data management because a DBMS associates its data records with metadata that includes information about the storage location of a record, the configuration of the data in the record, and the contents of the record.

The file server 530 is used by a file management system or file system to store the primary content. In general, file systems store data in a hierarchical name space. Files are accessed, located, and referenced by their unique name in this hierarchical name space.

Line 535 reflects the scalability of the scalable content managers, where one or more scalable content managers or nodes (SeCMs) 515, 555, 565, that are employed as building blocks, are inter-connected by a network. The network spans multiple protocols, operating systems, and platforms.

Figure 6:
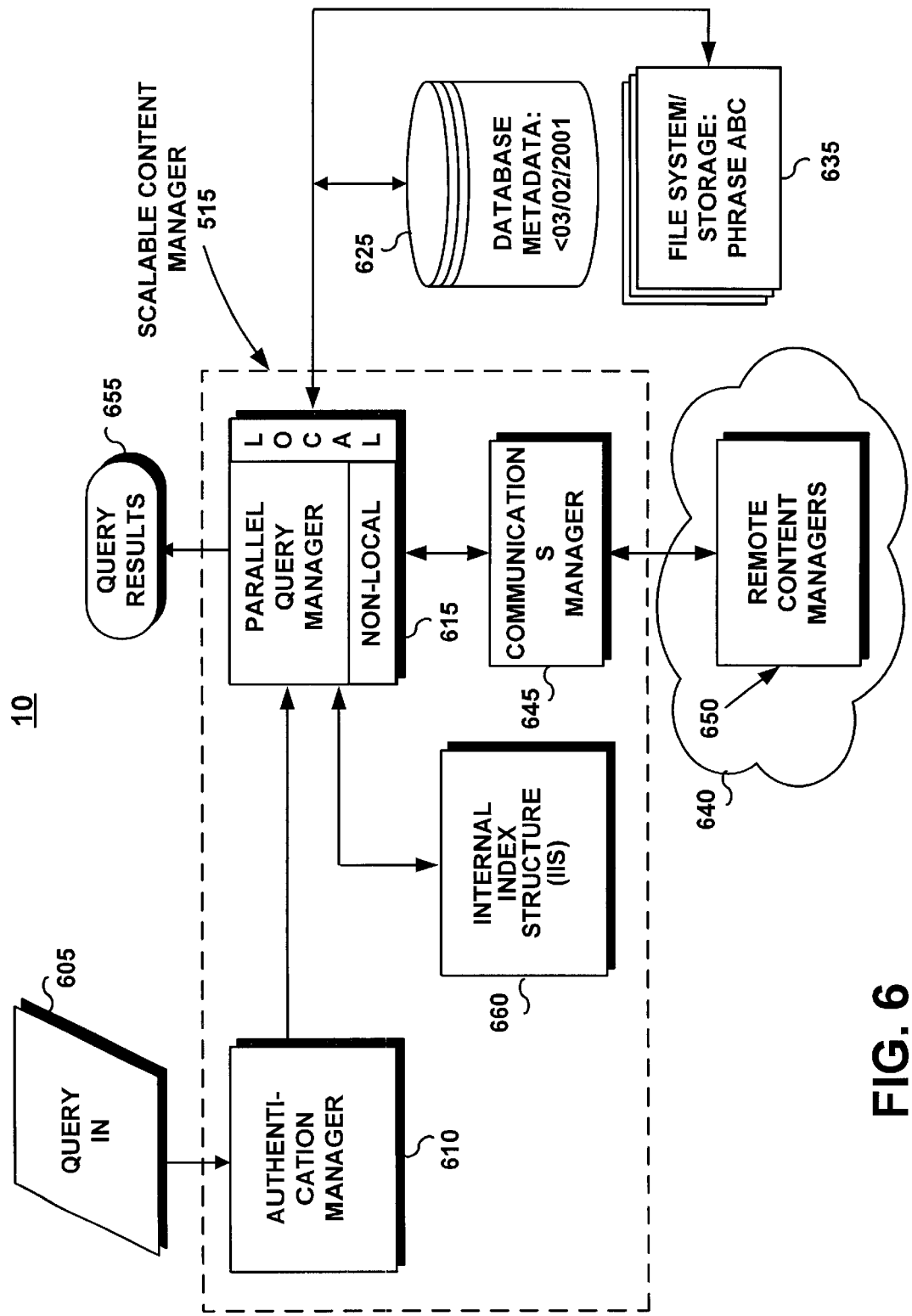
FIG. 6 is a more detailed block diagram of the scalable content management system architecture of FIG. 5.

A preferred embodiment of the scalable content management system 10 is illustrated in FIG. 6. The scalable content management system 10 includes a plurality of content managers, where one content manager 515 is illustrated in detail, and the remaining content managers, such as content managers 555 and 565 (FIG. 5) are represented by block 650. The various content managers are generally similar in function and design, and therefore only content manager 515 will be described in more detail.

The query or request to the scalable content manager 515 is initiated by a user client session as indicated in box 605 or by a query from another content manager 650, with a set of input criteria. For the purpose of illustration only, the input criteria are: "all documents created before Mar. 2, 2001" AND "containing the phrase "ABC". If the query is initiated from a local user client, and not by a remote content manager 650, it is subject to authentication by an authentication manager 610. On the other hand, if the query is initiated from a remote content manager 650 it is generally assumed that the remote client user has already been authenticated by the remote content manager 650 and will not be re-authenticated by the local content manager 515. According to another embodiment of the present invention, the local re-authentication feature could be enabled.

The authentication manager 610 manages the process of ascertaining whether a client, based on a log-in name and password, has access rights, and/or privileges to access the requested content. Without proper account information, access to the system (10) services is denied. Once the query is verified to be issued by a legitimate entity, that is from a bona fide client or content manager 650, it is forwarded to a parallel query manager 615.

The parallel query manager 615 processes the request or query, and determines whether such request or query can be served locally or not. If the request or query cannot be satisfied locally, it is forwarded to a communications manager 645 to be handled by one or more remote content managers 650.

However, if the request or query can be satisfied locally by the local content manager 515, it is processed against the metadata and content stored locally. Optionally, parallel query manager issues an internal request to an internal index structure (IIS) 660. The search results are then returned to 615 with the understanding that additional processing may be required at 615. Each content manager manages its own local index structure as no centralization is required to implement the scalable content management system 10.

Figure 7:
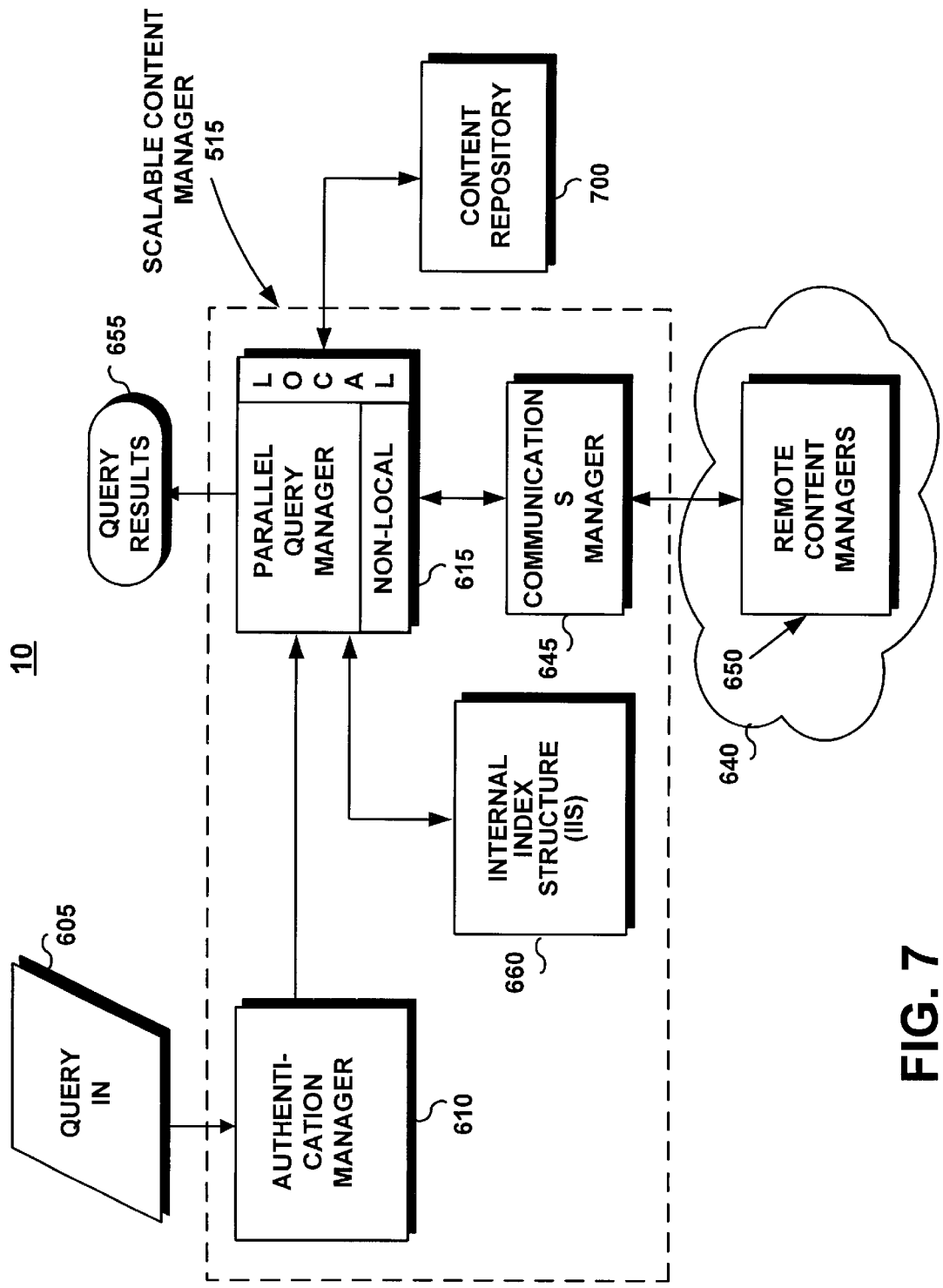
FIG. 7 is a more detailed block diagram of an alternative scalable content management system architecture of FIG. 5.

A database 625 is a repository for metadata, information about the primary content. The parametric search is conducted against a database 625. The actual metadata content satisfying the criterion "before Mar. 2, 2001", for example MD2, MD3, and MDx are extracted from the database 625 by the parallel query manager 615. In an alternative embodiment shown in FIG. 7, a single content repository 700 can be used to store both data (primary content) and metadata.

If the query also involves the content search, the parallel query manager 615 accesses the actual content (F1, F2, . . . , Fn) through a file server system (or a storage server) 635, and conducts content search. It retrieves and returns the reference to (or id of) the actual content, for example files F1, F2, and Fn.

The local search results from the content search and parametric search, if both exist, are combined by the parallel query manager 615, which may also be awaiting the remote search results from the remote content managers 650. In case of remote search results, both the local and the remote search results 655 are merged or appended, and returned to the user.

If the query were to be satisfied by the remote content managers 650, the communications manager 645 connects to other remote content managers 650 by sending requests and receiving the search results, as described above in connection with the content manager 515. The requests from the content manager 515 are multicasted to the parallel query managers of the remote content managers 650, which correspond to the parallel query manager of the content manager 515.

In turn, the remote content managers 650 process the requests they receive from the local content manager 515, as described earlier in connection with the operation of the local content manager 515.

If a query requests to retrieve the object (not just the reference to objects), the parallel query manager will retrieve the actual content from server 635, after first generates the reference list if needed, and return the content to the requesting application.

As the need arises, additional servlets can be installed to provide access to new data or functions. By virtue of the communications manager 645, clients can access any of the enterprise-wide information using a browser from anywhere on the network 20 (FIG. 1), making scalable content management system 10 directly accessible from any browser.

It is therefore clear that the scalable content management system 10 allows users to scale content management systems gracefully as their business grows. Initially, a client can install a single scalable content management system node, then add more scalable content management system nodes as needed. Installation of more scalable content management system nodes does not affect client applications, since the scalable content managers provide a single system view and location transparency.

The scalable content management system 10 provides an integrated content management function that manages both primary content and associated metadata. The integrated content manager function results in much simplified content management and application logic and improved system performance. In addition, existing content in file systems can be integrated into the scalable content management system 10 incrementally, and without the need of proprietary or a special loading process. In addition, the content of the scalable content management system 10 can be accessed directly by web browsers from anywhere on the network 20.

The scalable content management system 10 enables users to create a new scheme description and to begin entering metadata about their schemes, software, and databases. Users are prompted to categorize their schemes depending on material offered and other domain attributes. They may enter descriptions, content information, references, web addresses, and other pertinent information, through structured web forms. Once a scheme has been registered, users may create detailed profiles of the specific databases and software tools associated with that scheme, including development status, hardware and software dependencies, data models, query languages, input and output formats, protocols, licensing issues, and distribution methods. Users are also able to submit information to online domain definitions and concepts such as spreadsheets, 3D graphical models, waveforms, and digitized video, and to upload images and other multimedia files into a shared data repository. Data and files are accessed through a web gateway, which provides a hierarchical browsing interface and a configurable search engine.

Designing attributes and types (schemas) of the data structures that would contain information about applications is the first step in building a content manager block. The required database structures are usually developed without using low-level programming interface to the database definition language. The flexibility of object-relational data models enables users to easily denote the relationships among classes without explicitly interrelating with indices or table structures.

Once the schemas are defined, the content manager automatically generates user interfaces for importing, browsing, and editing metadata, based on the type and structure of information contained in the schemas. The content manager handles groupware requirements including login, authentication, and authorization to view or edit data according to clearance levels. The content manager's efficiency as a programming tool is evident in the ability it provides the user to customize interfaces for authoring and querying the repository. The content manager's high-level application program interface (API) abstracts the details of interfacing with common gateway interface (CGI) forms, importing and exporting data to the database, transferring files, managing images, and creating HTML documents.

While detailed descriptions of specific embodiments of the present invention have been provided, it would be apparent to those reasonably skilled in the art that numerous variations are possible in which the concepts of the present invention may readily be applied. The descriptions provided herein are for the sake of illustration and are not intended to be exclusive.

What is claimed is:

1. A scalable content management system, comprising:
  a local content manager;
  one or more remote content managers that are networked with the local content manager, and that can be selectively added or removed;
  the local content manager provides an integrated primary content and metadata management function
  the local content manager further concurrently searches data, in a local content repository and associated local metadata that are stored in the same content repository or the local database, as a unified search; and
  if needed, at least one of the remote content managers concurrently manages a remote file system and associated remote metadata.

2. The system of claim 1, further including a remote content repository and an associated remote metadata repository that is local to the at least one of the remote content managers.

3. The system of claim 1, wherein each of the local content managers and the remote content managers manages a specific local index structure.

4. The system of claim 3, wherein the local content manager includes an authentication manager that manages an authentication process.

5. The system of claim 4, wherein the local content manager further includes a parallel query manager that receives a query.

6. The system of claim 5, wherein the parallel query manager includes a local interface that receives a local query originating from the authentication manager and that generates a corresponding local search result.

7. The system of claim 6, wherein the parallel query manager further includes a non-local interface that receives a query originating from a remote content manager.

8. The system of claim 7, further including a communications manager that transmits the query originating from the remote content manager to the non-local interface of the parallel query manager.

9. The system of claim 8, wherein if a local query is not satisfied by the data in the local content repository and associated local metadata, the local query is forwarded to one or more remote content managers via the non-local interface and the communications manager, to generate a corresponding remote search result.

10. The system of claim 9, wherein the parallel query manager merges the local search result and the non-local search result, that are initiated by the local query, into a combined query search result.

11. A scalable content management method, comprising the steps of:
  a local content manager for concurrently searching data stored in a local content repository and associated local metadata, as a unified search;
  one or more remote content managers that are networked with the local content manager, and that can be selectively added or removed; and
  if needed, at least one of the remote content managers concurrently managing a remote content repository and associated remote metadata.

12. The method of claim 11, further including the step of storing the remote data and the associated remote metadata in a remote content repository or a database that is local to the at least one of the remote content managers.

13. The method of claim 11, wherein the step of having the local content manager concurrently search data stored in the local content repository and associated local metadata includes managing a specific local index structure.

14. The method of claim 13, wherein the local content manager includes an authentication manager for managing an authentication process.

15. The method of claim 14, wherein the local content manager further includes a parallel query manager for receiving a query.

16. The method of claim 15, wherein the parallel query manager receives a local query originating from the authentication manager and generating a corresponding local search result.

17. The method of claim 16, wherein the parallel query manager further includes receiving a query originating from a remote content manager.

18. The method of claim 17, further including conveying the query originating from the remote content manager to the parallel query manager.

19. The method of claim 18, wherein if a local query is not satisfied by the data in the local content repository and associated local metadata, forwarding the local query to one or more remote content managers, to generate a corresponding remote search result.

20. The method of claim 19, further including merging the local search result and the non-local search result into a combined query search result.

21. A scalable content management system, comprising:
  local content manager means for concurrently searching data stored in a local content repository or file system and associated local metadata, as a unified search;

a remote content manager means that can be selectively added or removed; and at the remote content manager means concurrently managing a remote data system and associated remote metadata.

22. The method of claim 21, further including means for storing the remote data and the associated remote metadata locally relative to the remote content manager means.

* * * * *